Oct. 13, 1942.   P. S. McCANN   2,298,829
CONVEYER SYSTEM
Filed July 20, 1940
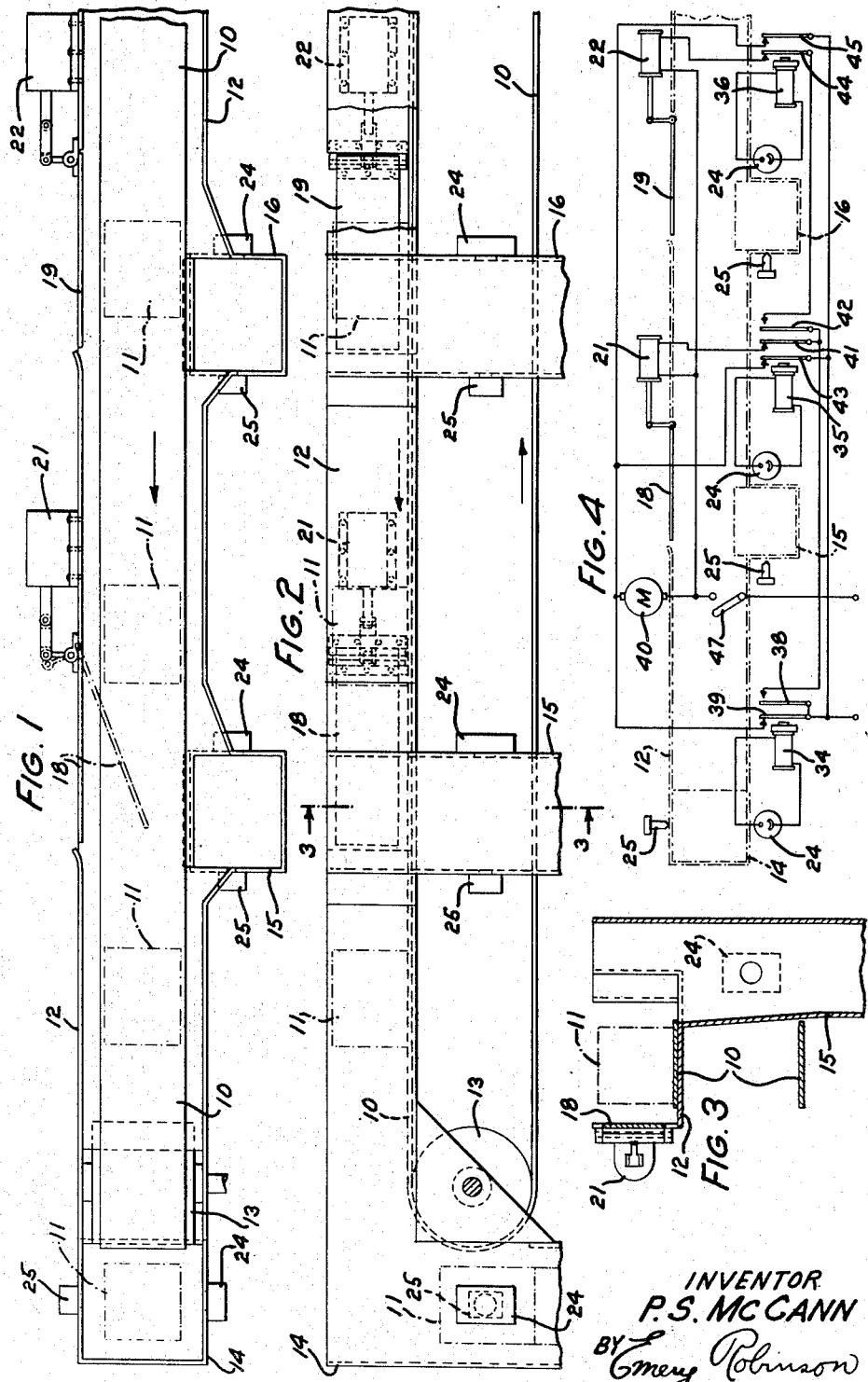
INVENTOR
P. S. McCANN
BY Emery Robinson
ATTORNEY Patented Oct. 13, 1942

2,298,829

UNITED STATES PATENT OFFICE 2,298,829

CONVEYER SYSTEM

Paul S. McCann, La Grange, Ill., assignor to Western Electric Company, Incorporated, New York, N. Y., a corporation of New York Application July 20, 1940, Serial No. 346,532

10 Claims. (Cl. 198—20)

This invention relates to conveyer systems, and more particularly to conveyer systems of the type in which articles are conveyed by a main conveyer to a plurality of separate stations.

Objects of the invention are to provide, in a conveyer system of the type referred to, simple and reliable means for selectively directing the articles from the main conveyor to the several stations.

In accordance with one embodiment of the invention, there is provided a conveyer system in which a plurality of separated chutes, each leading to a separate packing station, are arranged to receive packing cartons from a main conveyer, the cartons being selectively directed from the main conveyer into the several chutes by mechanism under the control of photoelectric cells disposed adjacent the entrance ends of the chutes.

Other features and advantages of the invention will become apparent from the following detailed description when read in conjunction with the accompanying drawing, in which—

Fig. 1 is a fragmentary plan view of a conveyor system embodying the invention;

Fig. 2 is a fragmentary elevational view thereof;

Fig. 3 is a vertical sectional view taken on line 3—3 of Fig. 2, and

Fig. 4 is a wiring diagram of the electrical operating and control circuits.

The conveyor system illustrated in the drawing comprises a motor driven endless conveyer belt 10 adapted to convey packing cartons 11, 11 along a horizontal guide channel or trough 12. From this trough, the cartons are selectively directed into one of a series of vertical chutes 14, 15 and 16, which deliver the cartons to three separate work stations or packing benches (not shown). Chute 14 is disposed at one end of the trough in line with the conveyer belt so as to receive cartons discharged from the conveyer belt as it travels around a pulley 13 rotatably mounted adjacent the upper end of the chute. Chutes 15 and 16 are disposed at spaced points along the trough with their open upper ends extending to one side of the conveyer belt, as shown in Fig. 1. On the opposite side of the conveyer belt a deflector 18 is pivotally mounted opposite the chute 15 and a similar deflector 19 is pivotally mounted opposite the chute 16. These deflectors normally assume the positions indicated in full lines in Fig. 1, wherein they do not interfere with the continuous delivery of cartons to the first chute 14. An electrical solenoid 21 is operatively connected to deflector 18 for swinging it across the conveyer belt to the position indicated in broken lines in Fig. 1. When swung to this position, the deflector 18 directs all oncoming cartons into the second chute 15. In a similar manner, deflector 19 is adapted to be operated by an electrical solenoid 22 to direct all oncoming cartons into the third chute 16.

A photoelectric cell 24 is mounted adjacent the upper end of each of the chutes opposite a suitable energizing light 25, the arrangement being such that when any one of the chutes becomes filled with cartons, the uppermost carton intercepts the energizing light of the associated photoelectric cell, whereby the cell is de-energized. Referring to Fig. 4, it will be observed that the cell associated with chute 14 is connected to a relay 34, and similar relays 35 and 36 are connected to the cells associated with chutes 15 and 16, respectively. Energization of the cells causes energization of the associated relays.

As shown in Fig. 4, relay 34 controls a normally closed switch 38 in the energizing circuit of deflector operating solenoid 21 and a normally open switch 39 in the operating circuit of a conveyer belt driving motor 40; relay 35 controls a normally open switch 41 in the energizing circuit of deflector operating solenoid 21, a normally closed switch 42 in the energizing circuit of deflector operating solenoid 22 and a normally open switch 43 in the conveyer belt motor circuit; and relay 36 controls a normally open switch 44 in the energizing circuit of deflector operating solenoid 22 and a normally open switch 45 in the conveyer belt motor circuit. As further shown in Fig. 4, the three motor control switches 39, 43 and 45 are connected in parallel, so that as long as one of these switches remains closed, the conveyer belt driving motor will continue to run and will stop only when all three switches are opened or upon the opening of a manually operated starting switch 47. The two solenoid controlling switches 38 and 41 are connected in series in the energizing circuit of solenoid 21, and the three solenoid controlling switches 38, 42 and 44 are connected in series in the energizing circuit of solenoid 22. Therefore, deflector 18 is swung to its operative position only upon the closing of both switches 38 and 41 and deflector 19 is swung to its operative position only upon the closing of all three of the switches 38, 42 and 44.

The operation of the conveyer system is as follows:

The energizing lights 25 for the photoelectric cells 24 having been illuminated, the closing of starting switch 47 will cause motor 40 to start driving conveyer belt 10 unless all three photoelectric cell controlled switches 39, 43 and 45 are open, which is the case only when all three chutes 14, 15 and 16 are completely filled with cartons. If none of the chutes is completely filled with cartons, the photoelectric cells at the three chutes will energize the associated relays 34, 35 and 36, whereby the switches controlled by these relays will be operated to the positions in which they are shown in Fig. 4. Therefore, the conveyer belt will be driven by motor 40 supplied by current through any one of the three relay controlled switches 39, 43 and 45, all of which are now closed. Since switch 38 in the energizing circuits of deflector operating solenoids 21 and 22 is now open, the solenoids are de-energized and, therefore, the deflectors will remain in their retracted or inoperative positions, thus permitting all of the cartons to be delivered to the first chute 14. As soon as this chute becomes completely filled with cartons, the uppermost carton will intercept the energizing light of the associated photoelectric cell, as illustrated in broken lines in Figs. 1 and 2. The associated relay 34 is thereby de-energized, thus opening motor controlling switch 39 and closing solenoid controlling switch 38. The conveyer belt motor will continue to run, however, on current supplied thereto through either of the two parallel connected switches 43 and 45, which are still closed. The closing of switch 38 completes the energizing circuit for solenoid 21, but the energizing circuit for solenoid 22 remains open since switch 42 in the latter circuit is still open. Solenoid 21, upon becoming energized, swings deflector 18 to its operative position, indicated in broken lines in Fig. 1, whereupon the oncoming cartons are directed by deflector 18 into the second chute 15. As soon as this chute becomes filled with cartons, the uppermost carton therein will intercept the energizing light of the associated photoelectric cell and thus cause the de-energization of associated relay 35. Upon de-energization of this relay, motor control switch 43 will open, control switch 41 for solenoid 21 will open and control switch 42 for solenoid 22 will close. The conveyer belt motor will continue to run, however, on current supplied thereto through switch 45, which is still closed. The opening of switch 41 will de-energize solenoid 21, whereupon deflector 18 is retracted to its inoperative position. The closing of switch 42 will complete the energizing circuit for solenoid 22, whereupon this solenoid will swing deflector 19 to its operative position and the cartons will thereby be deflected into the third chute 16. As soon as this chute becomes filled with cartons, the uppermost carton therein will intercept the energizing light of the associated photoelectric cell and thus cause de-energization of associated relay 36. Upon de-energization of this relay, motor control switch 45 will open and control switch 44 for solenoid 22 will also open, whereupon deflector 19 will be retracted to its inoperative position and the belt driving motor will stop and remain at rest until one of the chutes is partially emptied.

As soon as the supply of cartons in any one of the chutes drops below the beam of energizing light to the associated photoelectric cell, the latter will again energize the associated relay and thereby re-start the belt driving motor. In the illustrated embodiment of the invention, the deflector operating circuit arrangement is such that the first chute 14 receives preference over the second and third chutes 15 and 16, respectively, and the second chute receives preference over the third chute; that is, no cartons will be delivered to the second chute unless the first chute is filled, and no cartons will be delivered to the third chute unless the first and second chutes are both filled. Furthermore, if during the delivery of cartons to the second or third chutes, the supply of cartons in the first chute drops below the beam of energizing light to the associated photoelectric cell, the associated relay 34 will be re-energized, thus opening switch 38 which controls both of the deflector operating solenoids. The two deflectors will, therefore, be retracted and the cartons will be delivered to the first chute. Also, if during the delivery of cartons to the third chute, the supply of cartons in the second chute drops below the beam of energizing light to the associated photoelectric cell, the associated relay 35 will be re-energized, whereupon this relay will close switch 41 and open switch 42, thereby re-energizing solenoid 21 and de-energizing solenoid 22. Therefore, deflector 18 will be swung to its operative position and deflector 19 will be retracted to its inoperative position so that the delivery of cartons will be transferred from the third chute to the second chute. The relays 34, 35 and 36 are preferably of the slow acting type so that they are not affected by the momentary interruption of the energizing lights to the associated photoelectric cells during the passage of the cartons into the respective chutes.

From the above description, it will be obvious that a simple and reliable system is provided by means of which a single main conveyer is adapted to supply packing cartons or the like to a plurality of separated work stations, and by means of which the cartons are delivered to only one station at a time and in predetermined sequence. It should be understood, of course, that the novel features of the invention are not limited to the particular embodiments thereof herein illustrated and described, but are capable of other applications within the scope of the appended claims.

What is claimed is:

1. In a conveyer system, a conveyer, a series of separate stations arranged to receive articles from the conveyer, means at one of said stations for diverting articles from the conveyer to said station, and means responsive to the presence of articles in another of said stations when accumulated therein beyond a predetermined point for operating said diverting means to divert articles to said first-mentioned station.

2. In a conveyer system, a conveyer, a plurality of vertical chutes arranged to receive articles from said conveyer, and means adjacent the entrance end of one of said chutes and responsive to the presence of articles in said chute for controlling the diversion of articles from the conveyer into another of said chutes.

3. In a conveyer system, a conveyer, a series of separate article receiving chutes spaced along said conveyer, a deflector adjacent one of said chutes for diverting articles from the conveyer into said chute, and means adjacent another of said chutes and rendered effective by articles in said second chute, when stacked therein above a predetermined level, for operating said deflector.

4. In a conveyer system, a conveyer, a plurality of vertical chutes arranged to receive articles from said conveyer, means for diverting articles from said conveyer into one of said chutes, and means rendered effective by articles in another of said chutes, when stacked therein above a predetermined level, for operating said diverting means.

5. In a conveyer system, a conveyer, a plurality of vertical chutes arranged to receive articles from said conveyer, a deflector adjacent one of said chutes for diverting articles from the conveyer into said chute, and a photoelectric cell rendered effective by articles in another of said chutes, when stacked therein above a predetermined level, for controlling said deflector.

6. In a conveyer system, a main conveyer, a plurality of chutes arranged to receive articles from said conveyer, a light responsive device and a source of energizing light therefor mounted opposite each other on one of said chutes so that said light is intercepted by articles delivered to said chute when stacked therein above a predetermined level, and means under the control of said light responsive device for diverting articles from said conveyer into another of said chutes.

7. In a conveyer system, a main conveyer, a plurality of vertical chutes having open upper ends for receiving articles from said conveyer, a photoelectric cell and a source of energizing light therefor mounted opposite each other adjacent the upper end of one of said chutes so that the beam of energizing light is intercepted by articles when stacked to a predetermined level in said chute, a deflector for diverting articles from said conveyer into another of said chutes, and means under the control of said photoelectric cell for operating said deflector.

8. In a conveyer system, a main conveyer, a plurality of article receiving chutes arranged along said conveyer, a photolectric cell and a source of energizing light therefor mounted opposite each other in each of said chutes so that the energizing lights are intercepted by articles in the respective chutes when stacked therein above a predetermined level, and means under the control of said photoelectric cells for selectively diverting articles from said main conveyer into said chutes.

9. In a conveyer system, an article conveying belt, a plurality of chutes arranged to receive articles from said conveyer belt, a photoelectric cell associated with each of said chutes, an energizing light for each photoelectric cell arranged to be intercepted by articles in the respective chutes when stacked therein above a predetermined level, driving means for the conveyer belt, and means under the joint control of said photoelectric cells for controlling said driving means.

10. In a conveyer system, an article conveying belt, a plurality of chutes arranged to receive articles from said conveyer belt, a photoelectric cell associated with each of said chutes, an energizing light for each photoelectric cell arranged to be intercepted by articles in the respective chutes when stacked therein above a predetermined level, means under the control of said photoelectric cells for selectively diverting articles from said conveyer belt into said chutes, driving means for said conveyer belt, and means under the joint control of said photoelectric cells for controlling said driving means.

PAUL S. McCANN.